(12) United States Patent
Matsushita

(10) Patent No.: US 11,597,473 B2
(45) Date of Patent: Mar. 7, 2023

(54) ELECTRIC SNOWMOBILE

(71) Applicant: Yamaha Hatsudoki Kabushiki Kaisha, Shizuoka (JP)

(72) Inventor: Yasushi Matsushita, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 100 days.

(21) Appl. No.: 17/402,639

(22) Filed: Aug. 16, 2021

(65) Prior Publication Data
US 2022/0111929 A1    Apr. 14, 2022

(30) Foreign Application Priority Data
Oct. 8, 2020  (JP) .............................. JP2020-170459

(51) Int. Cl.
| | | |
|---|---|---|
| *B62M 27/02* | (2006.01) | |
| *B60K 1/00* | (2006.01) | |
| *B60K 1/02* | (2006.01) | |
| *B60K 11/02* | (2006.01) | |

(52) U.S. Cl.
CPC ............ *B62M 27/02* (2013.01); *B60K 1/00* (2013.01); *B60K 11/02* (2013.01); *B60K 2001/003* (2013.01); *B60K 2001/005* (2013.01); *B60K 2001/006* (2013.01); *B62M 2027/027* (2013.01); *B62M 2027/028* (2013.01)

(58) Field of Classification Search
CPC ............ B62M 27/02; B62M 2027/027; B62M 2027/028; B60K 1/00; B60K 11/02; B60K 2001/005; B60K 2001/006; B60K 2001/003
See application file for complete search history.

(56) References Cited

U.S. PATENT DOCUMENTS

| | | |
|---|---|---|
| 5,490,572 A | 2/1996 | Tajiri et al. |
| 10,597,105 B2 | 3/2020 | Lefebvre et al. |
| 2020/0088089 A1 | 3/2020 | Vezina et al. |
| 2021/0138868 A1* | 5/2021 | Bruneau ............ B60H 1/00278 |

FOREIGN PATENT DOCUMENTS

JP        H05262144 A     10/1993

* cited by examiner

*Primary Examiner* — Jacob M Amick
(74) *Attorney, Agent, or Firm* — Hea Law PLLC

(57) ABSTRACT

An electric snowmobile that performs heat exchange with a simple structure is provided. The electric snowmobile includes a body frame, a driver's seat, an electric motor, a ski, a track mechanism, a battery, a cooling unit that cools fluid at least in accordance with outside air, a first heat exchange unit that performs heat exchange between the battery and the fluid, a second heat exchange unit that performs heat exchange between the electric motor and the fluid, a first flow path for delivering the fluid cooled in the cooling unit to the first heat exchange unit, a second flow path for delivering the fluid cooled in the cooling unit to the second heat exchange unit, and a third flow path for delivering the fluid heat-exchanged in the first heat exchange unit and the fluid heat-exchanged in the second heat exchange unit to the cooling unit.

14 Claims, 14 Drawing Sheets

ELECTRIC SNOWMOBILE

CROSS-REFERENCE TO RELATED APPLICATION

The present application claims priority from Japanese application JP2020-170459 filed on Oct. 8, 2020, the content of which is hereby incorporated by reference into this application.

FIELD OF THE INVENTION

The present invention relates to an electric snowmobile.

BACKGROUND OF THE INVENTION

Description of the Related Art

JPH05-262144A discloses that the electric vehicle adjusts a temperature of the battery using the air conditioning function.

Here, a snowmobile traveling by an electric motor is desired in view of quietness, for example. The electric motor is driven by electric power supplied from a battery mounted on a vehicle body. In such snowmobiles, it is necessary to control the temperature of the battery and the electric motor so that their temperature does not increase. However, unlike passenger vehicles, snowmobiles are not provided with an air conditioning function as disclosed in JPH05-262144A, and thus cannot adjust the temperature of the battery and the electric motor using the air conditioning function. Further, the temperature of the battery and the electric motor may be adjusted using a heat exchanger, but the structure is complicated when providing a heat exchanger in each of the battery and the electric motor.

SUMMARY OF THE INVENTION

One of the objects of the present disclosure is to provide an electric snowmobile capable of heat exchange with a simple structure.

(1) An electric snowmobile proposed in the present disclosure includes a body frame extending in a front-rear direction, a driver's seat supported by the body frame, an electric motor supported by the body frame, a ski supported by the body frame, a track mechanism, which includes a track belt, and which is supported by the body frame below the driver's seat, a battery that supplies electric power to the electric motor, a cooling unit that cools fluid at least in accordance with outside air, a first heat exchange unit that performs heat exchange between the battery and the fluid, a second heat exchange unit that performs heat exchange between the electric motor and the fluid, a first flow path for delivering the fluid cooled in the cooling unit to the first heat exchange unit, a second flow path for delivering the fluid cooled in the cooling unit to the second heat exchange unit, and a third flow path for delivering the fluid heat-exchanged in the first heat exchange unit and the fluid heat-exchanged in the second heat exchange unit to the cooling unit. According to this snowmobile, heat exchange can be performed with a simple structure.

(2) The electric snowmobile according to (1) may include a flow rate adjusting unit capable of adjusting a flow rate of the fluid sent to the first flow path and a flow rate of the fluid sent to the second flow path. This enables heat exchange to be performed on the fluid.

(3) In the electric snowmobile according to (1), the flow rate adjusting unit may deliver the fluid to at least one or both of the first flow path and the second flow path. This enables heat exchange to be performed on the fluid.

(4) The electric snowmobile according to (1) may include a control unit that controls the flow rate adjusting unit based on at least one of a temperature of the battery or a temperature of the electric motor. This enables heat exchange to be performed on the fluid.

(5) In the electric snowmobile according to (1), the first flow path and the second flow path may join at a joining portion and be connected to the third flow path.

The electric snowmobile according to (6) may include a pump for delivering the fluid to the third flow path through the first flow path and/or the second flow path.

The electric snowmobile according to (7) may include a heating unit that heats the fluid flowing through at least the first flow path or the second flow path. This prevents temperatures of the battery and/or the electric motor from decreasing.

(8) In the electric snowmobile according to (7), the heating unit may be a heating sheet that heats the battery. This prevents temperature of the battery from decreasing.

(9) In the electric snowmobile according to (8), the heating sheet may be disposed below the driver's seat and on an upper surface of the battery. This prevents temperature of the battery from decreasing while the driver's seat is heated.

(10) In the electric snowmobile according to (1), at least one of the cooling unit or the first heat exchange unit forms a portion of the body frame. This serves to reduce the number of parts in the body frame and helps to reduce the weight of the body frame.

(11) In the electric snowmobile according to (1), an upper plate of the body frame may be a plate-like heat exchanger including the cooling unit and the first heat exchange unit. This serves to reduce the number of parts in the body frame and helps to reduce the weight of the body frame.

(12) In the electric snowmobile according to (1), an opening is formed in an upper plate of the body frame such that at least one of the cooling unit or the first heat exchange unit is exposed from the opening so as to face the track belt. This improves cooling performance of the heat exchanger.

(13) In the electric snowmobile according to (1), the cooling unit may have a larger capacity than the first heat exchange unit. This improves cooling performance of the heat exchanger.

(14) In the electric snowmobile according to (1), the battery may be disposed below the driver's seat and on the first heat exchange unit.

DETAILED DESCRIPTION OF THE INVENTION

An embodiment of the present invention (hereinafter, referred to as "present embodiment") will be described below in detail with reference to the accompanying drawings.

Figure 1:
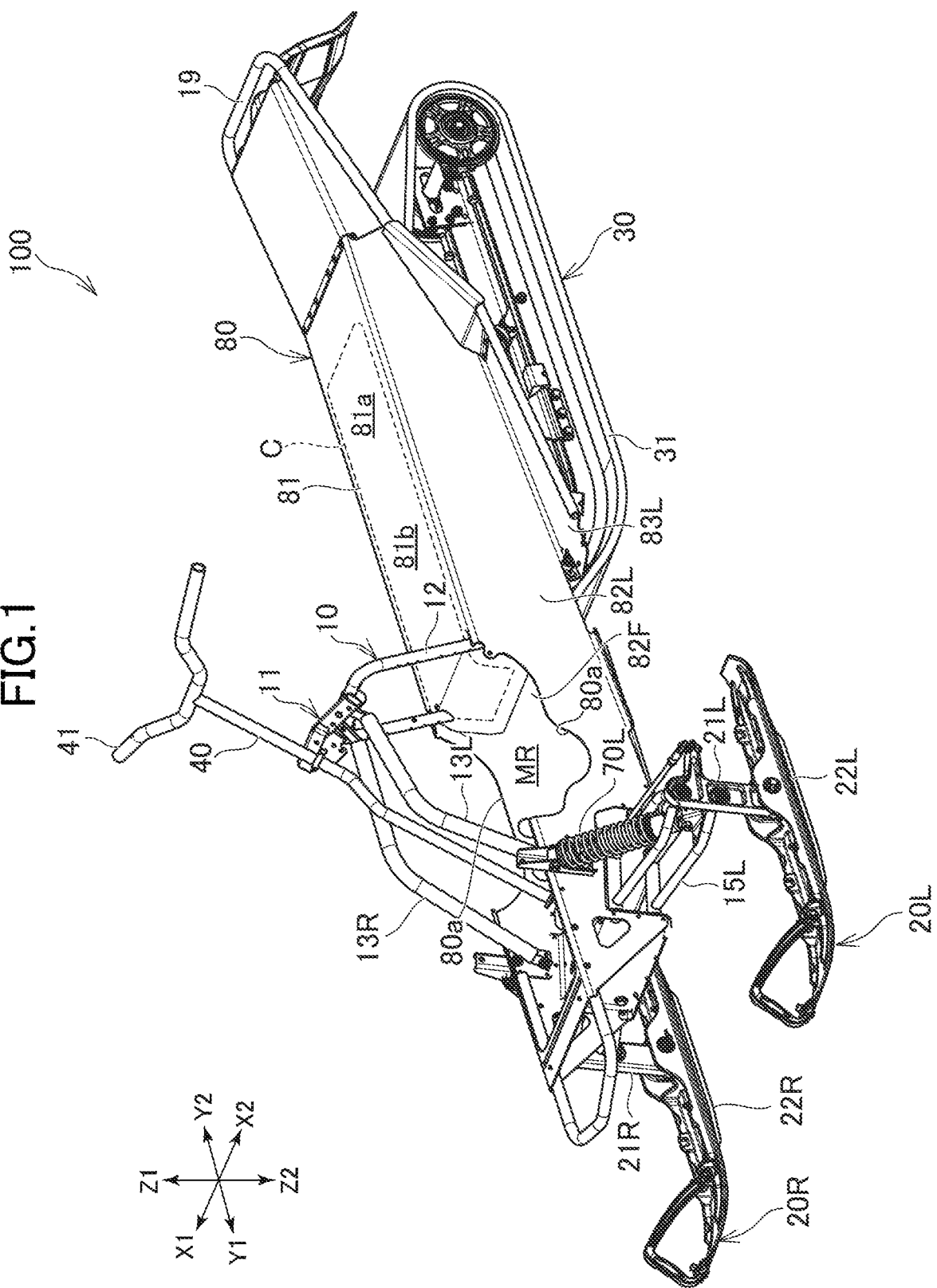
FIG. 1 is a perspective view of an electric snowmobile according to the present embodiment seen obliquely from above on a front side of the electric snowmobile.
Figure 2:
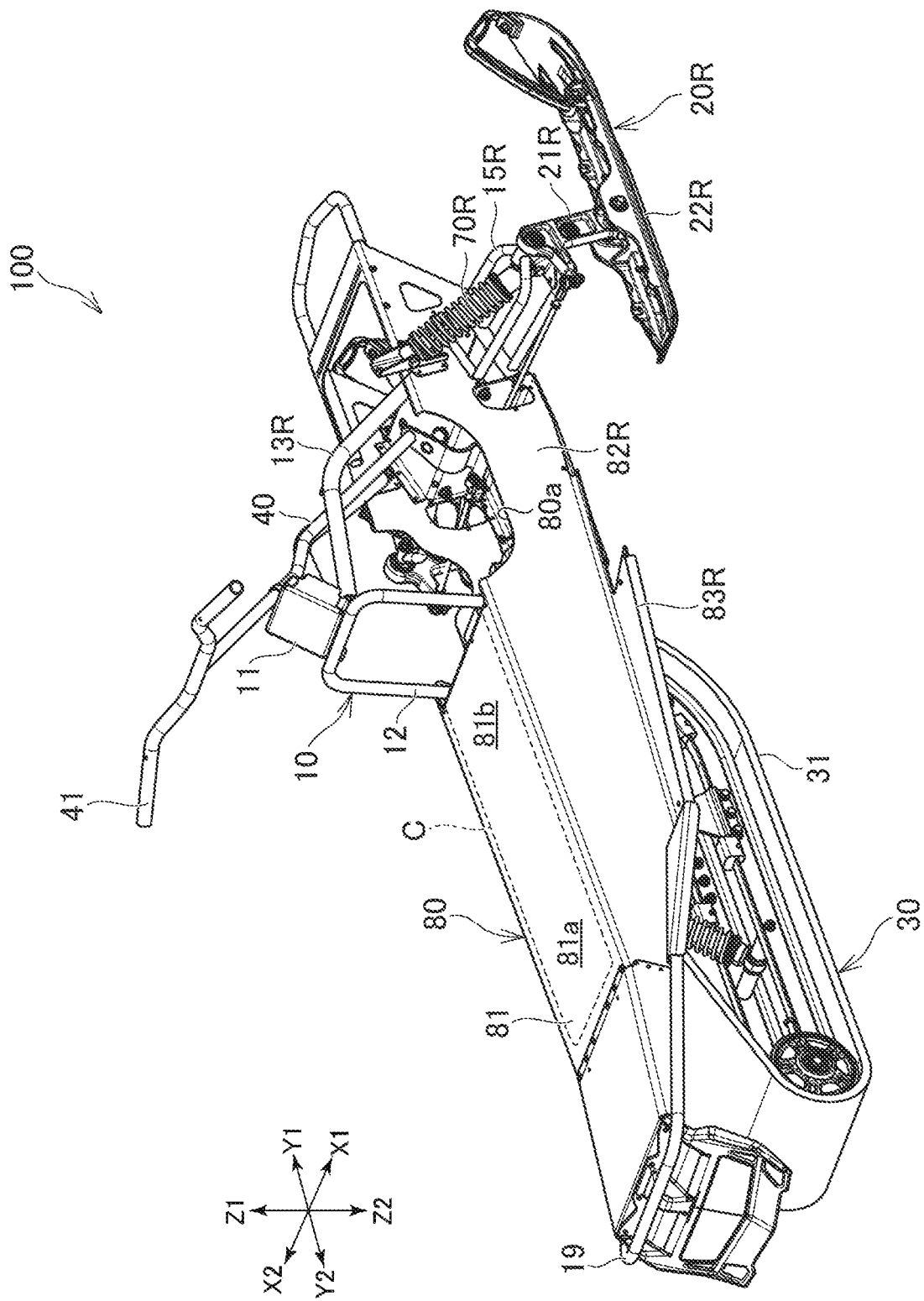
FIG. 2 is a perspective view of the electric snowmobile according to the present embodiment seen obliquely from above on a rear side of the electric snowmobile.
Figure 3:
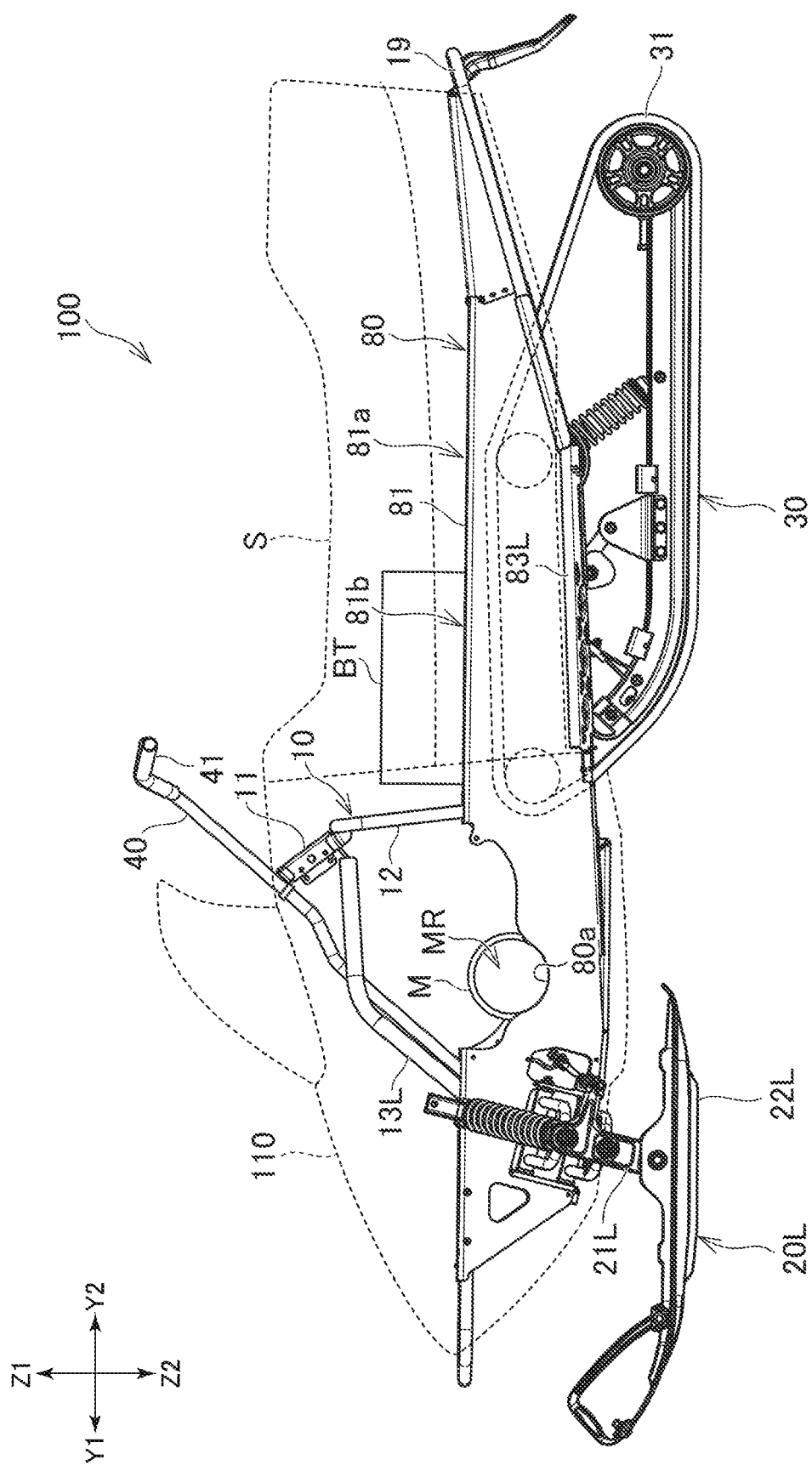
FIG. 3 is a side view of the electric snowmobile according to the present embodiment seen from the left.
Figure 4:
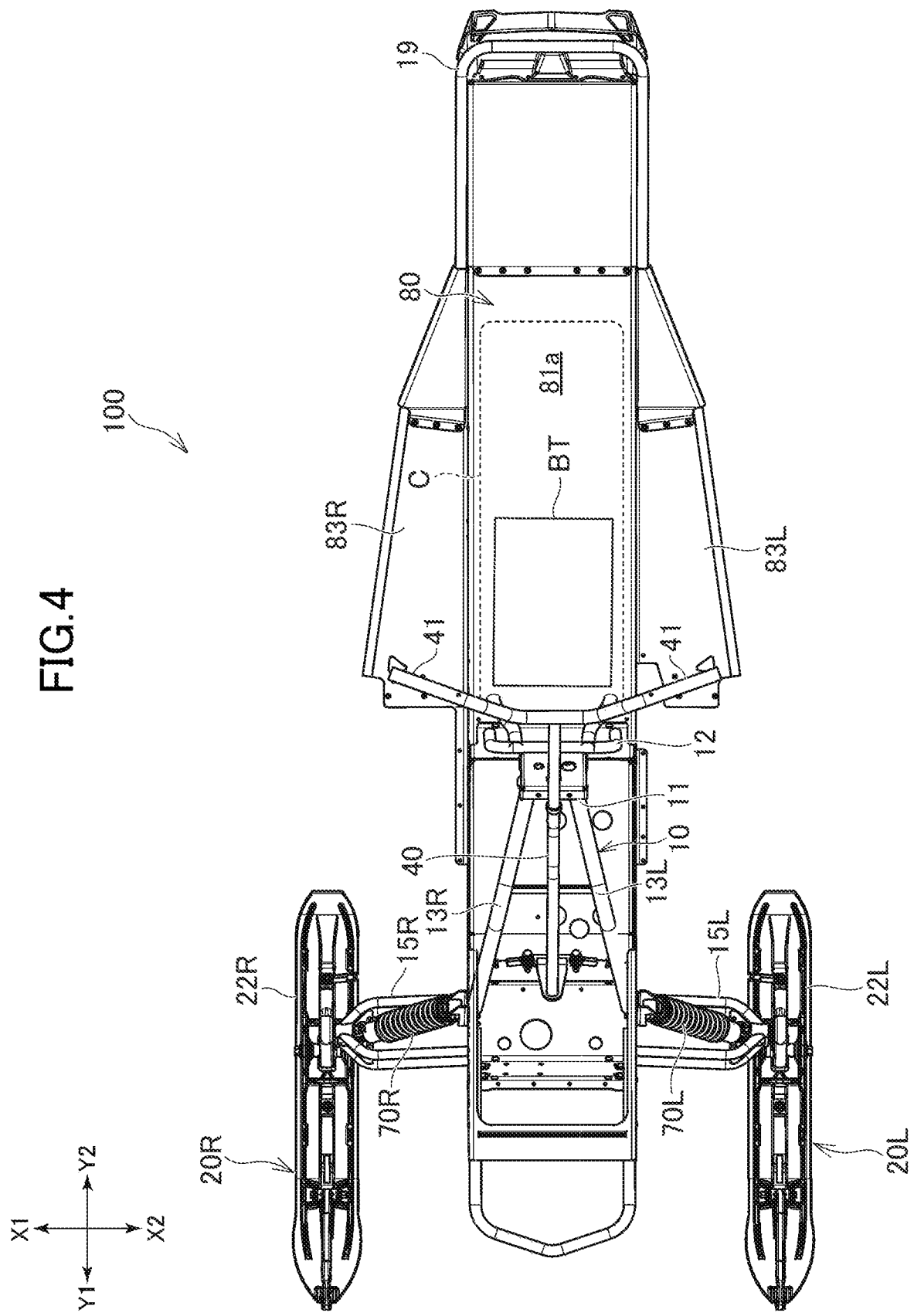
FIG. 4 is a top view of the electric snowmobile according to the present embodiment.
Figure 5:
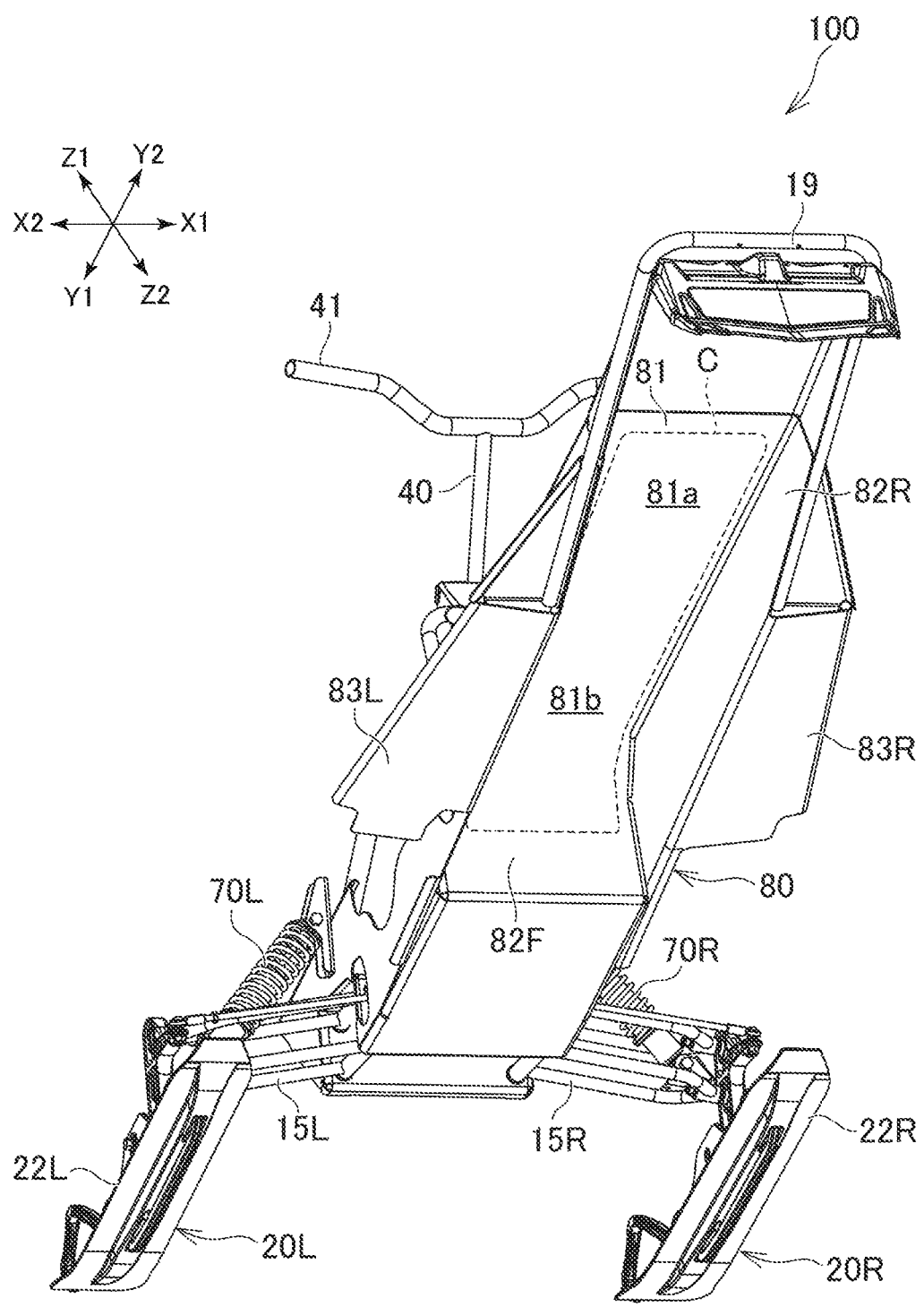
FIG. 5 is a perspective view of the electric snowmobile according to the present embodiment seen obliquely from below on a rear side of the electric snowmobile.

FIG. 1 is a perspective view of an electric snowmobile according to the present embodiment seen obliquely from above on a front side of the electric snowmobile. FIG. 2 is a perspective view of the electric snowmobile according to the present embodiment seen obliquely from above on a rear side of the electric snowmobile. FIG. 3 is a side view of the electric snowmobile according to the present embodiment seen from the left. FIG. 4 is a top view of the electric snowmobile according to the present embodiment. FIG. 5 is a perspective view of the electric snowmobile according to the present embodiment seen obliquely from below on a rear side of the electric snowmobile.

In the following description, the directions indicated by Y1 and Y2 in the respective drawings are referred to as a front direction and a rear direction, respectively. The directions indicated by X1 and X2 are referred to as a right direction and a left direction, respectively. The direction indicated by Z1 and Z2 are referred to as an upward direction and a downward direction, respectively.

In the present specification, the term "supported" ("support") is used not only to indicate that a first member is directly attached to and supported by (supports) a second member, but also to indicate that the first member is attached to a third member and is supported by the second member via the third member.

[Outline of Electric Snowmobile 100]

An electric snowmobile 100 according to the present embodiment is a straddled vehicle that travels mainly on the snow. The electric snowmobile 100 travels by driving an electric motor M by electric power from a battery BT. The temperatures of the battery BT and the electric motor M increase when being driven.

The electric motor M is shown in FIG. 3 and omitted in FIGS. 1, 2, and 4. The battery BT is shown in FIGS. 3 and 4 and omitted in FIGS. 1 and 2. In FIG. 5, a track mechanism 30 is omitted.

An outer cover and a driver's seat are omitted in FIGS. 1, 2, and 4 so that the vehicle interior is visible, and an outer cover 110 and a driver's seat S are illustrated in broken lines in FIG. 3.

The snowmobile 100 includes a shaft support frame 10, a right ski 20R, a left ski 20L, a track mechanism 30, a steering shaft 40, a body frame 80, an electric motor M, and a battery BT.

[Shaft Support Frame 10]

The shaft support frame 10 is a frame for supporting the steering shaft 40, and mainly composed of a pipe-like member. The member forming the shaft support frame 10 is not limited to a pipe-like member, and may include a plate-like member. The shaft support frame 10 may be made of metal or resin, for example. The shaft support frame 10 includes a shaft support portion 11, an auxiliary frame 12, a right front frame 13R, and a left front frame 13L.

As shown in FIG. 3, the shaft support portion 11 extends rearwardly and downwardly in a side view, and rotatably supports the steering shaft 40 at its front end.

As shown in FIG. 2, the upper portion of the auxiliary frame 12 is attached to the shaft support portion 11. The lower portion of the auxiliary frame 12 has an inverted U-shape supported by the body frame 80.

The right front frame 13R and the left front frame 13L extend forwardly and downwardly from the shaft support portion 11. The right front frame 13R and the left front frame 13L are disposed to be spaced apart from each other in the vehicle width direction.

As shown in FIG. 4, the right front frame 13R is inclined to the right direction toward the front. The left front frame 13L is inclined to the left direction toward the front. That is, the right front frame 13R and the left front frame 13L are provided so as to be spaced apart from each other toward the front.

The steering shaft 40 extends upwardly and rearwardly, and its lower end is rotatably supported by the body frame 80. A steering handle 41 is provided at the upper end of the steering shaft 40. The steering shaft 40 is also rotatably supported by the shaft support frame 10 at the middle of its lower end and upper end.

The frames and the portions forming the shaft support frame 10 may be formed integrally, or may be separated and fixed to each other by coupling means such as bolts or welding or other known methods. Further, the frames and the portions forming the shaft support frame 10 may be made of resin and integrally formed with each other.

[Right Ski 20R, Left Ski 20L]

The electric snowmobile 100 further includes a right ski support frame 15R and a left ski support frame 15L. The right ski support frame 15R extends rightward at the front portion of the body frame 80 and supports the right ski 20R at its right end. The left ski support frame 15L extends leftward at the front portion of the body frame 80 and supports the left ski 20L at its left end.

The right ski 20R is composed of a supported portion 21R supported by the right ski support frame 15R and extending downward, and a plate portion 22R attached to the lower end of the supported portion 21R. Similarly, the left ski 20L is composed of a supported portion 21L supported by the left ski support frame 15L and extending downward, and a plate portion 22L attached to the lower end of the supported portion 21L.

In the present embodiment, suspensions 70R and 70L each having a spring structure and a damper are provided so as to cross the right ski 20R, the left ski 20L, and the body frame 80.

[Track Mechanism 30]

Track mechanism 30 is supported by the body frame 80 more rearward than the right ski 20R and left ski 20L. The track mechanism 30 includes a track belt 31 that is rotated by the driving force of the electric motor M. The rotation of the track belt 31 moves the vehicle body.

[Electric Motor M]

As shown in FIG. 3, the electric motor M is supported by the body frame 80. In the present embodiment, the electric motor M is located more rearward than the mounting positions of the right ski 20R and the left ski 20L to the right ski support frame 15R and the left ski support frame 15L. In this manner, the relatively heavy electric motor M is disposed rearward, and thus the center of gravity of the vehicle body can be positioned rearward. This eases the handling of the steering handle 41 and enables comfortable travel.

[Battery BT]

Figure 6:
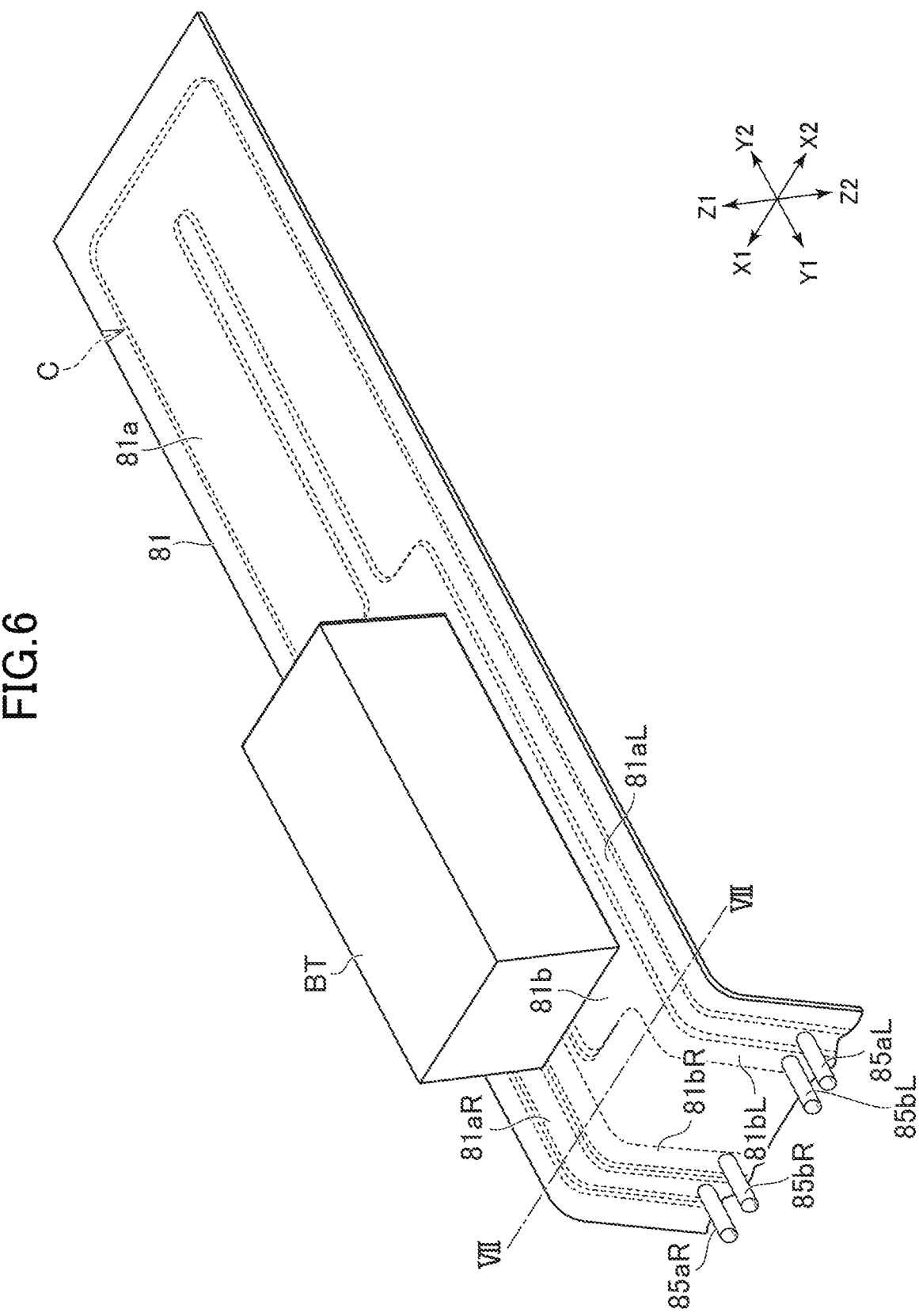
FIG. 6 is a perspective view of a heat exchanger and a battery mounted on the heat exchanger of the present embodiment.

The battery BT supplies power to the electric motor M. The operation of the battery BT may be controlled by a battery controller, such as a BMS (Battery Management System) (not shown). In the present embodiment, as shown in FIGS. 3, 4, and 6 described later, the battery BT is provided below the driver's seat S and on a first heat exchange unit 81b of a heat exchanger 81 described later.

[Body Frame 80]

The body frame 80 forms the skeleton of the vehicle body and also supports each component of the electric snowmobile 100. Specifically, the body frame 80 supports the shaft support frame 10, the right ski 20R, the left ski 20L, the track mechanism 30, the steering shaft 40, the electric motor M, and the battery BT.

The body frame 80 extends in the front-rear direction, and supports lower ends of respective portions of the shaft support frame at its front portion, and a bumper 19 is provided at its rear portion. On the body frame 80, the driver's seat S shown in FIG. 3 is supported at a position rearward of the front portion supporting the lower end of the shaft support frame 10 and forward of the bumper 19.

In the present embodiment, the body frame 80 has a motor housing region MR for accommodating the electric motor M (see e.g., FIG. 1). The motor housing region MR is a region that is recessed with respect to the upper surface of the body frame 80, and notches 80a are formed at the left and right ends of the motor housing region MR. The left and right end portions of the electric motor M are fitted into the notches 80a and supported by the body frame 80. In this manner, the relatively heavy electric motor M is provided in the lower portion of the vehicle body, and thus the center of gravity of the vehicle body can be lowered. The lowered center of gravity of the vehicle body enables comfortable travel.

The body frame 80 includes a plate-like heat exchanger 81, a front side plate 82F extending downwardly along the front portion of the heat exchanger 81, a left side plate 82L extending downwardly from the left portion of the heat exchanger 81, and a right side plate 82R extending downwardly from the right portion of the heat exchanger 81. The heat exchanger 81, the left side plate 82L, and the right side plate 82R form a space in which the upper portion of the track belt 31 is accommodated.

The heat exchanger 81 is a rectangular plate-like member and its front-rear direction is the longitudinal direction in a top view. The driver's seat S is placed directly or indirectly on the heat exchanger 81.

As shown in FIG. 3, the battery BT may be disposed on the heat exchanger 81. Specifically, the battery BT may be disposed on the first heat exchange unit 81b, to be described later, of the heat exchanger 81. In FIG. 3, the number and size of the battery BT are merely examples, and the embodiments described herein are not limited thereto.

The lower end of the left side plate 82L includes a left step 83L on which the left foot of the driver, sitting in the driver's seat S, is placed. The lower end of the right side plate 82R includes a right step 83R on which the right foot of the driver, sitting in the driver's seat S, is placed. The left step 83L and the right step 83R are shaped in a plate having a predetermined width in the vehicle width direction.

[Body Frame 80: Configuration of Heat Exchanger 81]

Figure 7:
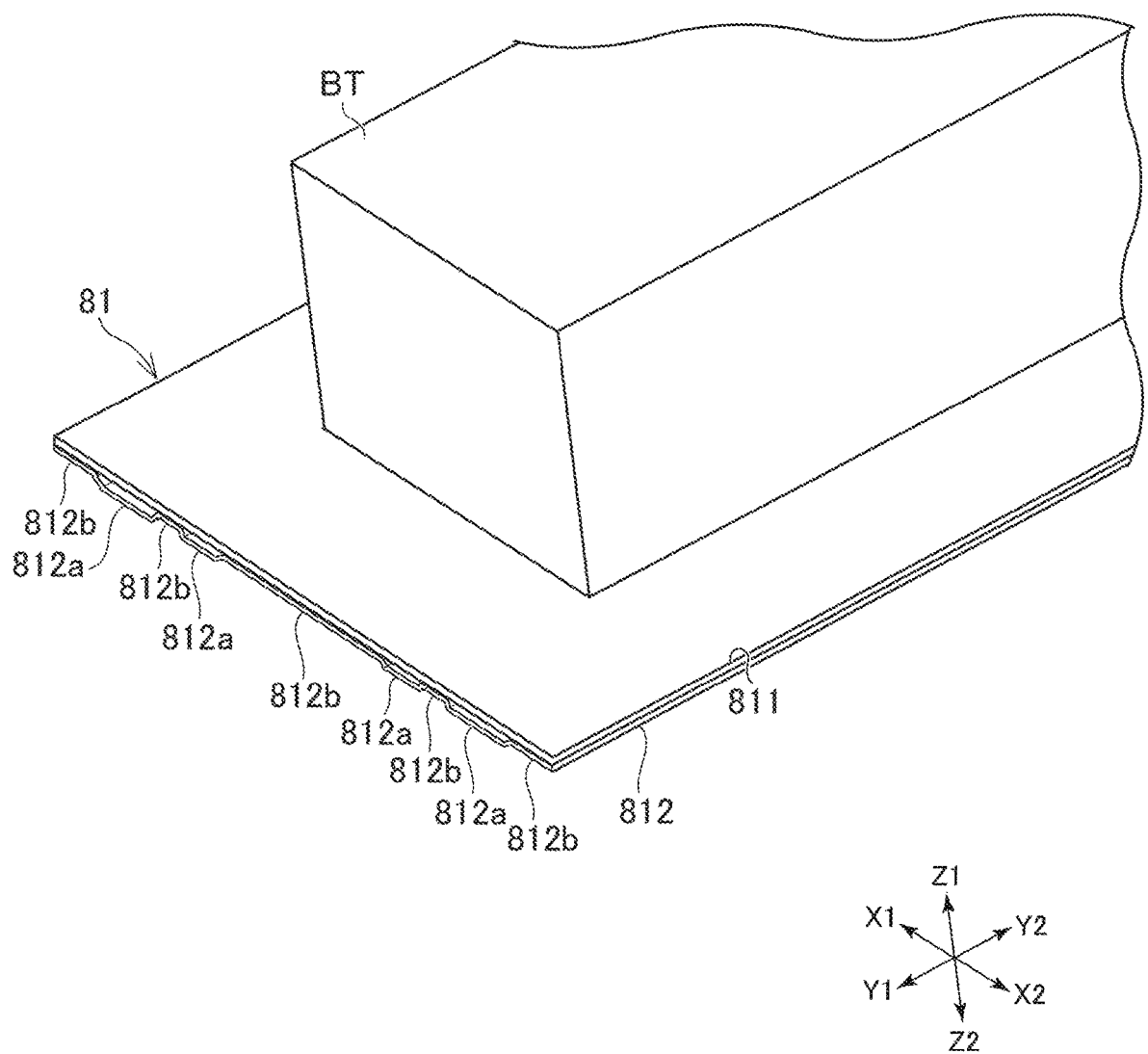
FIG. 7 is an enlarged cross-sectional view of an upper sheet metal and a lower sheet metal of the heat exchanger shown in FIG. 6.
Figure 8:
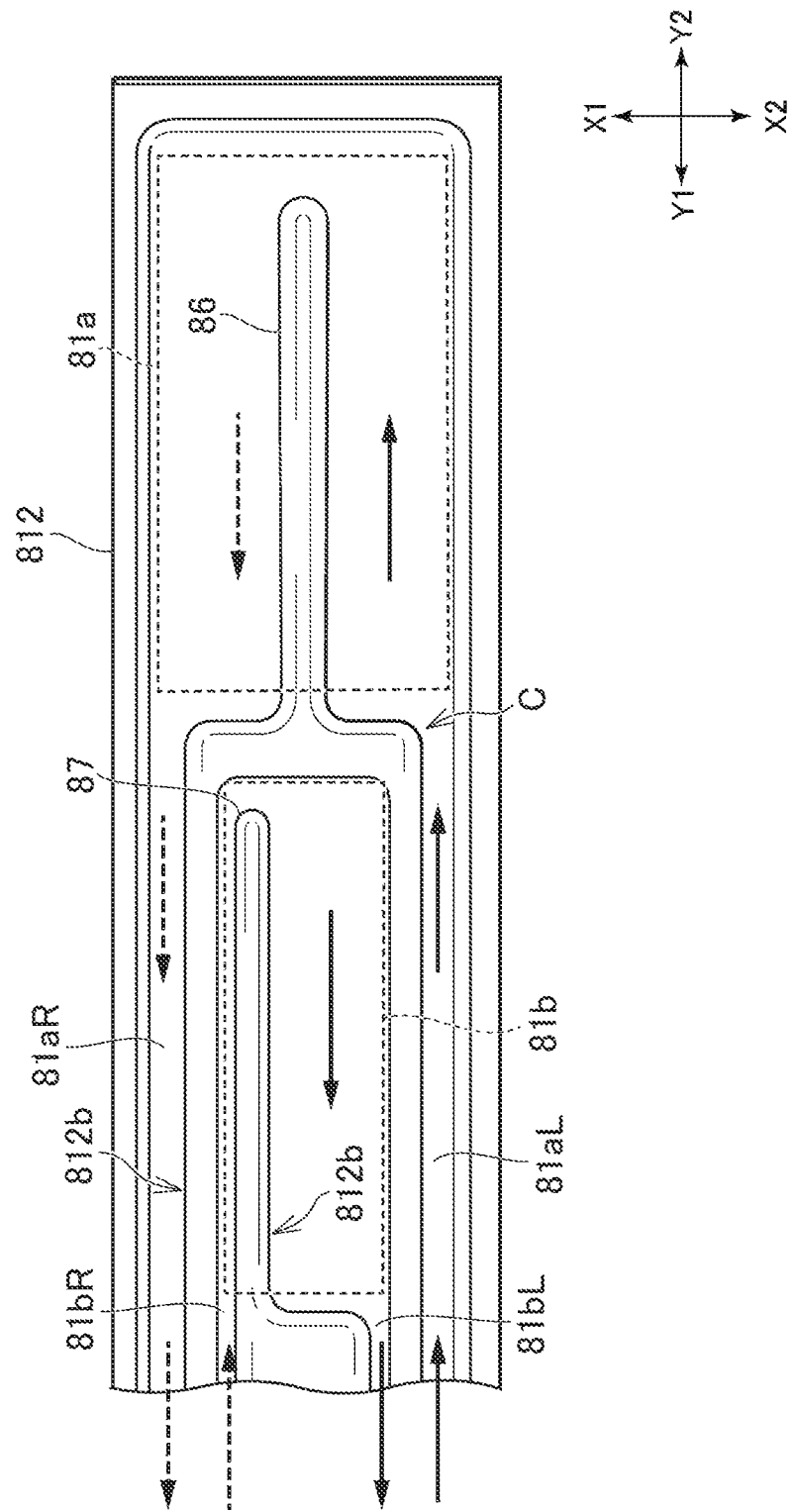
FIG. 8 is a top view of the lower sheet metal of the heat exchanger.

Next, referring mainly to FIGS. 6 to 8, the configuration of a heat exchanger of the present embodiment will be described. FIG. 6 is a perspective view of a heat exchanger and a battery mounted on the heat exchanger of the present embodiment. FIG. 7 is an enlarged cross-sectional view of an upper sheet metal and a lower sheet metal of the heat exchanger taken along the line VII-VII shown in FIG. 6. FIG. 8 is a top view of the lower sheet metal of the heat exchanger. The arrows shown in FIG. 8 show fluid flow. Specifically, dashed arrows indicate flow of fluid functioning as a coolant.

The heat exchanger 81 includes a flow path C in which the fluid flows and is contained. In FIG. 1, for example, the outer shape of the flow path C is illustrated by a broken line. In the present embodiment, water is used as the fluid, but the present invention is not limited thereto and any other medium may be used if the medium is a gas or liquid capable of carrying heat.

The heat exchanger 81 is formed of two overlapping sheet metals. As shown in FIG. 7, the heat exchanger 81 includes an upper sheet metal 811 and a lower sheet metal 812. The upper sheet metal 811 and the lower sheet metal 812 may be made of material having a high thermal conductivity, for example, metals such as iron, aluminum, and stainless steel. The upper sheet metal 811 and the lower sheet metal 812 may be joined to each other by welding, for example.

The upper sheet metal 811 is a plate-like member in which upper and lower surfaces are flat surfaces. The lower sheet metal 812 is a plate-like pressed member having an uneven surface. As shown in FIG. 7, a recess 812a of the lower sheet metal 812 forms a space in which the fluid flows between the upper sheet metal 811 and the lower sheet metal 812. A convex portion 812b of the lower sheet metal 812 is joined to the lower surface of the upper sheet metal 811, and partitions the space in which the fluid flows.

As shown in FIG. 6, the front portion of the heat exchanger 81 is curved downward. That is, the front portion of the heat exchanger 81 has a shape along the front side plate 82F shown in FIG. 1. However, the shape of the heat exchanger 81 shown in FIG. 6 is an example, and is not limited thereto.

In the present embodiment, as shown in FIG. 8, the flow path C includes a cooling unit 81a, a right connection flow path 81aR, and a left connection flow path 81aL.

The cooling unit 81a is a portion for cooling the fluid flowing into the cooling unit 81a in accordance with the difference in temperature from the outside air. When the electric snowmobile 100 travels on the snow where the outside temperature is low, the fluid flowing into the cooling unit 81a is cooled.

As shown in FIG. 3, the cooling unit 81a is disposed above the track belt 31. As such, moisture and snow adhering to the track belt 31 is moved upward with the rotation of the track belt 31, and comes into contact with the back surface of the cooling unit 81*a*. In this manner, the fluid flowing through the cooling unit 81*a* is cooled in accordance with the temperature difference between the moisture and snow in contact with the back surface of the cooling unit 81*a*.

As shown in FIG. 6, the front portion of the right connection flow path 81*a*R is connected to a right pipe 85*a*R, and the front portion of the left connection flow path 81*a*L is connected to a left pipe 85*a*L. The left pipe 85*a*L is a portion forming at least a portion of a third flow path C3 to be described later.

The right pipe 85*a*R and the left pipe 85*a*L extend forwardly toward the electric motor M, and only a part of them is shown in FIG. 6. The same applies to a right pipe 85*b*R and a left pipe 85*b*L to be described later. In FIG. 1, pipes connected to the heat exchanger 81 are omitted.

The right connection flow path 81*a*R is a portion for connecting the cooling unit 81*a* to a valve structure V (see e.g., FIG. 9) to be described later through the right pipe 85*a*R. The left connection flow path 81*a*L is a portion for connecting the cooling unit 81*a* to the first heat exchange unit 81*b* and a second heat exchange unit 55 (see e.g., FIG. 9), to be described later, through the left pipe 85*a*L.

In the present embodiment, as shown in FIG. 8, the flow path C further includes a first heat exchange unit 81*b*, a right connection flow path 81*b*R, and a left connection flow path 81*b*L.

The first heat exchange unit 81*b* is a portion for exchanging heat between the battery BT and the fluid in accordance with the temperature difference between the battery BT disposed on the heat exchanger 81*b* and the fluid flowing in the first heat exchange unit 81*b*. If the temperature of the battery BT is lower than the temperature of the fluid flowing in the first heat exchange unit 81*b*, the battery BT is heated. If the temperature of the battery BT is higher than the temperature of the fluid flowing in the first heat exchange unit 81*b*, the battery BT is cooled.

As shown in FIG. 6, the front portion of the right connection flow path 81*b*R is connected to the right pipe 85*b*R, and the front portion of the left connection flow path 81*b*L is connected to the left pipe 85*b*L.

The right connection flow path 81*b*R is a portion for connecting the first heat exchange unit 81*b* to the valve structure V to be described later through the right pipe 85*b*R. The left connection flow path 81*b*L is a portion for connecting the first heat exchange unit 81*b* to the cooling unit 81*a* and a second heat exchange unit 55 (see e.g., FIG. 9) to be described later through the left pipe 85*b*L. The right pipe 85*b*R and the left pipe 85*b*L form at least a part of a first flow path C to be described later.

As shown in FIG. 8, the cooling unit 81*a* is formed rearward of the first heat exchange unit 81*b*. The right connection flow path 81*a*R and the left connection flow path 81*a*L are formed further outside of the vehicle width direction than the right connection flow path 81*b*R and the left connection flow path 81*b*L. That is, the first heat exchange unit 81*b*, the right connection flow path 81*b*R, and the left connection flow path 81*b*L are formed so as to be surrounded by the cooling unit 81*a*, the right connection flow path 81*a*R, and the left connection flow path 81*a*L in a plan view.

The length of the first heat exchange unit 81*b* in the front-rear direction is preferably longer than the length of the battery BT. The width of the first heat exchange unit 81*b* in the vehicle width direction (left-right direction) is preferably wider than the width of the battery BT. Such a configuration allows the entire lower surface of the battery BT to be disposed on the first heat exchange unit 81*b*, thereby efficiently performing the heat exchange between the battery BT and the fluid flowing in the first heat exchange unit 81*b*.

The cooling unit 81*a* preferably has a larger capacity than the first heat exchange unit 81*b*. In other words, as shown in FIG. 8, the area of the cooling unit 81*a* in a plan view is preferably larger than the area of the first heat exchange unit 81*b* in a plan view. As described, the cooling unit 81*a* has a relatively large area among the portions forming the heat exchanger 81, and this serves to increase the cooling performance. That is, the fluid can be more efficiently cooled. As a result, the battery BT and the electric motor M can be more efficiently cooled.

As shown in FIG. 8, the convex portion 812*b* of the lower sheet metal 812 has an extending portion 86 extending in the front-rear direction in the cooling unit 81*a*. The extending portion 86 divides the cooling unit 81*a* into a region connected to the right connection flow path 81*a*R and a region connected to the left connection flow path 81*a*L. Such a configuration allows the fluid in the cooling unit 81*a* to flow faster and efficiently circulate. In FIG. 8, an example is shown in which the extending portion 86 is provided in the center of the cooling unit 81*a* in the vehicle width direction, although the arrangement of the extending portion 86 in the vehicle width direction is not limited thereto.

As shown in FIG. 8, the convex portion 812*b* of the lower sheet metal 812 has an extending portion 87 extending in the front-rear direction in the first heat exchange unit 81*b*. The extending portion 87 divides the first heat exchange unit 81*b* into a region connected to the right connection flow path 81*b*R and a region connected to the left connection flow path 81*b*L. Such a configuration allows the fluid in the first heat exchange unit 81*b* to flow faster and circulate efficiently. In FIG. 8, an example is shown in which the extending portion 87 is provided rightward of the center of the heat exchange unit 81*b* in the vehicle width direction, although the arrangement of the extending portion 87 in the vehicle width direction is not limited thereto.

A seal member may be provided between the convex portion 812*b* of the lower sheet metal 812 and the back surface of the upper sheet metal 811. This prevents the fluid from flowing back and forth between the cooling unit 81*a* and the first heat exchange unit 81*b* via the convex portion 812*b*.

[Heat Exchange in this Embodiment]

Next, referring to FIGS. 9 to 12, heat exchange in the present embodiment will be described. FIGS. 9 to 12 are schematic diagrams illustrating flow paths and peripheral members in the electric snowmobile according to the present embodiment.

As shown in FIGS. 9 to 12, in addition to the configuration described above, the electric snowmobile 100 includes a valve structure V, which is a flow rate adjusting unit including an upstream valve V1 and a downstream valve V2, a pump P, a heater H, which is a heating unit, a second heat exchange unit 55, an actuator 91, and a control unit 92. In FIGS. 9 to 12, the pipes shown in FIG. 6 are omitted.

Further, the electric snowmobile 100 includes a first flow path C1 for delivering the fluid cooled in the cooling unit 81*a* to the first heat exchange unit 81*b*, and a second flow path C2 for delivering the fluid cooled in the cooling unit 81*a* to the second heat exchange unit 55. Further, the electric snowmobile 100 includes a third flow path C3 for delivering the fluid heat-exchanged by the first heat exchange unit 81*b* and the fluid heat-exchanged by the second heat exchange unit 55 to the cooling unit 81*a*.

In the present embodiment, the first flow path C1 includes a flow path for connecting the upstream valve V1 and the downstream valve V2 with the right connection flow path 81*b*R of the first heat exchange unit 81*b*. The second flow path C2 includes a flow path for connecting the downstream valve V2 with the second heat exchange unit 55.

The third flow path C3 connects a joining unit 93 of the first flow path C1 in which the fluid heat-exchanged by the first heat exchange unit 81*b* flows and the second flow path C2 in which the fluid heat-exchanged by the second heat exchange unit 55 flows with the left connection flow path 81*a*L of the cooling unit 81*a*. That is, the first flow path C1 and the second flow path C2 join at the joining unit 93 and are connected to the third flow path C3.

The configurations of the first flow path C1, the second flow path C2, and the third flow path C3 are not particularly limited, but may be a tube in which fluid flows, for example.

The second heat exchange unit 55 has a structure in which the fluid flows and is contained, and performs heat exchange between the electric motor M and the fluid in accordance with the temperature difference between the electric motor M and the fluid flowing through the second heat exchange unit 55. If the temperature of the electric motor M is lower than the temperature of the fluid flowing through the second heat exchange unit 55, the electric motor M is to be heated. If the temperature of the electric motor M is higher than the temperature of the fluid flowing through the second heat exchange unit 55, on the other hand, the electric motor M is to be cooled. The second heat exchange unit 55 may be, for example, a water jacket attached to the electric motor M.

The valve structure V is configured to deliver fluid to at least one of or both of the first flow path C1 and the second flow path C2. Such a configuration enables flowing the fluid in accordance with the object for which heat exchange is performed. Further, the valve structure V can adjust a flow rate of the fluid to be delivered to the first flow path C1 and a flow rate of the fluid to be delivered to the second flow path C2. The valve structure V includes the upstream valve V1 and the downstream valve V2 that are connected to each other via the pump P. Although a detailed description of their structure is omitted, the upstream valve V1 and the downstream valve V2 are both three-way valves.

The upstream valve V1 is connected to the right connection flow path 81*a*R, the first flow path C, and the pump P. That is, the upstream valve V1 has a structure capable of delivering the fluid which has flowed into the valve structure V to one of the right connection flow path 81*a*R, the first flow path C1, or the pump P.

The downstream valve V2 is connected to the first flow path C1, the second flow path C2, and the pump P. That is, the downstream valve V2 has a structure capable of delivering the fluid which has flowed into the valve structure V to one of the first flow path C1, the second flow path C2, or the pump P.

The actuator 91 is a device that is controlled by the control unit 92 and switches the direction and the flow rate of the fluid flowing into the valve structure V.

The control unit 92 may operate the actuator 91 based on at least one of the temperature of the battery BT and the temperature of the electric motor M, thereby controlling the valve structure V. For example, if the temperature of the battery BT is lower than a predetermined threshold, the control unit 92 may control the valve structure V to generate a flow that cools the battery BT. Although not shown, the electric snowmobile 100 may include a temperature sensor for detecting the temperature of the battery BT and a temperature sensor for detecting the temperature of the electric motor M.

The pump P has a function of delivering the fluid flowed into the valve structure V to the third flow path C3 through the first flow path C1 and/or the second flow path C2.

Figure 9:
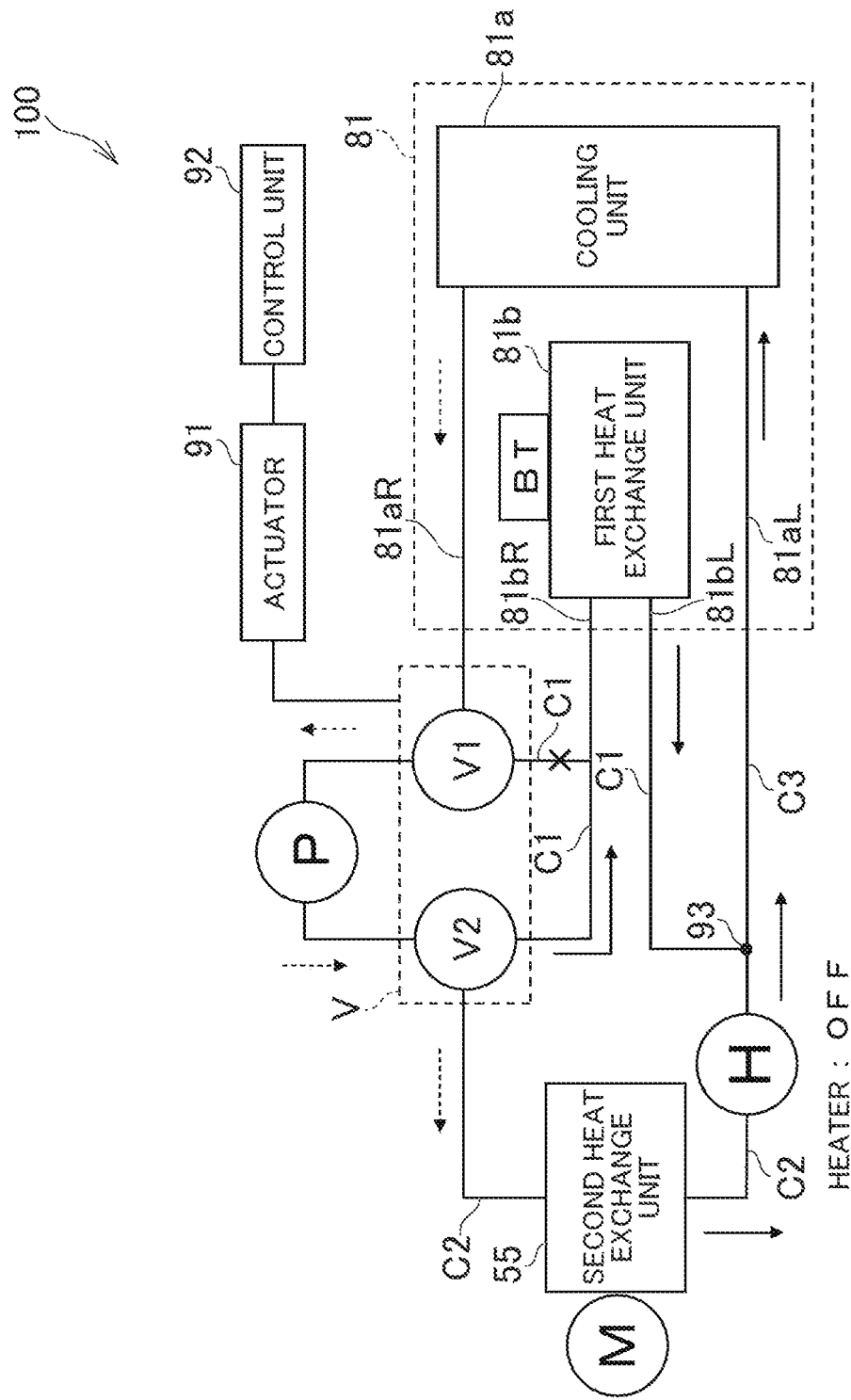
FIG. 9 is a schematic diagram of a flow path and its peripheral members in the electric snowmobile according to the present embodiment.

The heater H is a device for heating the fluid. In FIG. 9, for example, the heater H is provided at a position for heating the fluid flowing through the second flow path C2.

[Heat Exchange in the Present Embodiment: Cooling of Battery BT and Electric Motor M]

Referring to FIG. 9, the cooling of the battery BT and the electric motor M using the heat exchanger 81 will be described.

The arrows shown in FIG. 9 indicate the direction in which the fluid flows. "x" (cross mark) shown in FIG. 9 indicates that the fluid does not flow in the marked flow path. The direction in which the fluid flows is determined by the operation of the pump P and the valve structure V. The same applies to FIGS. 10 to 13 to be described later.

In the example shown in FIG. 9, the pump P and the valve structure V operate so as to deliver the fluid flowing into the valve structure V to each of the first flow path C1 and the second flow path C2.

First, the fluid flowing in the cooling unit 81*a* is cooled in accordance with the temperature difference from the outside air and snow. Subsequently, the fluid cooled by the cooling unit 81*a* flows into the valve structure V through the right connection flow path 81*a*R. A part of the fluid flowing into the valve structure V is delivered to the first flow path C1, and the other part is delivered to the second flow path C2.

The fluid delivered to the first flow path C1 flows into the first heat exchange unit 81*b*. The fluid flowing into the first heat exchange unit 81*b* is heat-exchanged with the battery BT. This decreases the temperature of the battery BT while the temperature of the fluid increases. That is, the fluid functions as a coolant, thereby cooling the battery BT.

The fluid heated in the first heat exchange unit 81*b* flows into the cooling unit 81*a* through the first flow path C1, the third flow path C3, and the left connection flow path 81*a*L. As described above, the fluid heated in the first heat exchange unit 81*b* returns to the cooling unit 81*a* to be cooled again.

The fluid delivered to the second flow path C2 by the valve structure V flows into the second heat exchange unit 55. The fluid flowing into the second heat exchange unit 55 is heat-exchanged with the electric motor M. This decreases the temperature of the electric motor M while the temperature of the fluid increases. That is, the fluid functions as a coolant, thereby cooling the electric motor M.

The fluid heated in the second heat exchange unit 55 flows into the cooling unit 81*a* through the second flow path C2, the third flow path C3, and the left connection flow path 81*a*L. As described above, the fluid heated in the second heat exchange unit 55 returns to the cooling unit 81*a* to be cooled again.

As described above, in the example shown in FIG. 9, the cooling of the fluid by the cooling unit 81*a* and the cooling of the battery BT and the electric motor M by the fluid are repeatedly performed. This controls the rise in the temperature of the battery BT and the electric motor M.

When the temperatures of the battery BT and the electric motor M are equal to or higher than a predetermined threshold value, the control unit 92 may operate the actuator 91 so as to control the valve structure V to generate the flow of fluid shown in FIG. 9. The flow rate of the fluid delivered from the valve structure V to the first flow path C1 may be the same as or different from the flow rate of the fluid delivered from the valve structure V to the second flow path C2.

[Heat Exchange in the Present Embodiment: Cooling of Electric Motor M]

Figure 10:
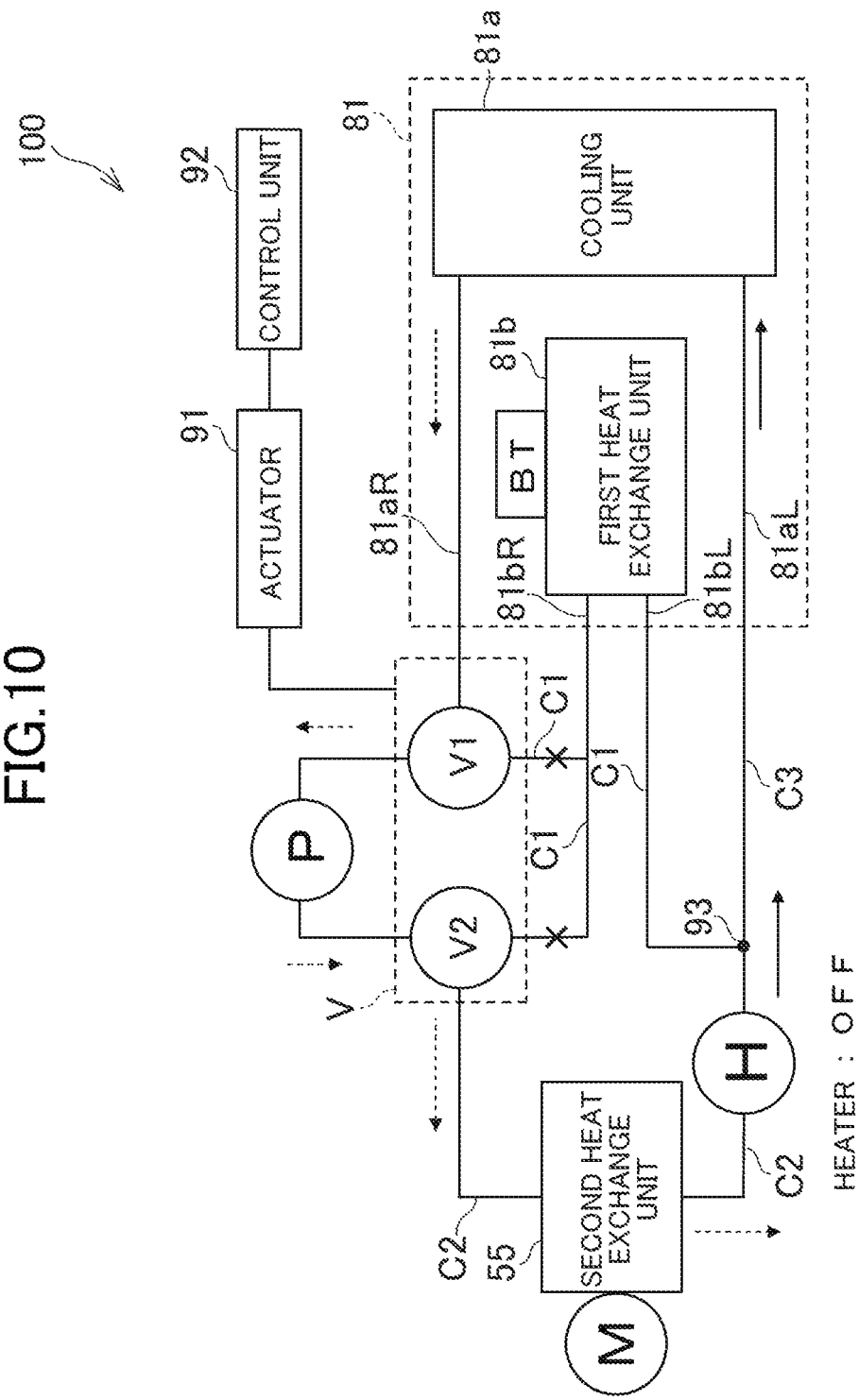
FIG. 10 is a schematic diagram of a flow path and its peripheral members in the electric snowmobile according to the present embodiment.

Referring to FIG. 10, the cooling of the electric motor M using the heat exchanger 81 will be described.

In the example shown in FIG. 10, the pump P and the valve structure V operate so as to deliver the fluid flowing into the valve structure V to the second flow path C2.

First, the fluid flowing in the cooling unit 81a is cooled in accordance with the temperature difference from the outside air and snow. Subsequently, the fluid cooled by the cooling unit 81a flows into the valve structure V through the right connection flow path 81aR. The fluid flowing into the valve structure V is delivered to the second flow path C2.

The fluid delivered to the second flow path C2 flows into the second heat exchange unit 55. The fluid flowing into the second heat exchange unit 55 is heat-exchanged with the electric motor M. This decreases the temperature of the electric motor M while the temperature of the fluid increases. That is, the fluid functions as a coolant, thereby cooling the electric motor M.

The fluid heated in the second heat exchange unit 55 flows into the cooling unit 81a through the second flow path C2, the third flow path C3, and the left connection flow path 81aL. As described above, the fluid heated in the second heat exchange unit 55 returns to the cooling unit 81a to be cooled again.

As described above, in the example shown in FIG. 10, the cooling of the fluid by the cooling unit 81a and the cooling of the electric motor M by the fluid are repeatedly performed. This controls the rise in the temperature of the electric motor M. In this example, the heat exchange between the fluid and the battery BT is not performed, which enables cooling the electric motor M more efficiently.

[Heat Exchange in the Present Embodiment: Cooling of Battery BT]

Figure 11:
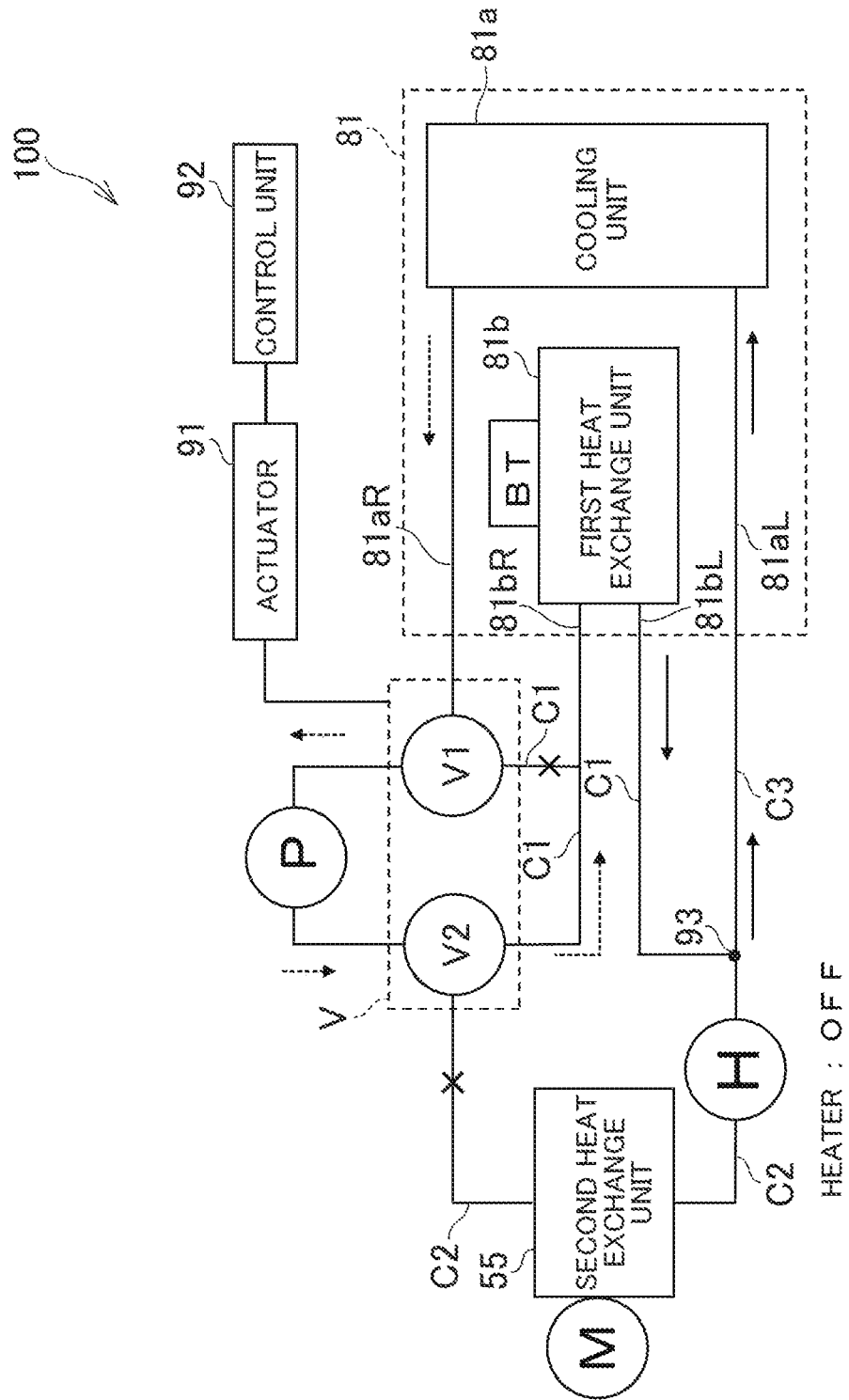
FIG. 11 is a schematic diagram of a flow path and its peripheral members in the electric snowmobile according to the present embodiment.

Referring to FIG. 11, the cooling of the battery BT using the heat exchanger 81 will be described.

In the example shown in FIG. 11, the pump P and the valve structure V operate so as to deliver the fluid flowing into the valve structure V to the first flow path C1.

First, the fluid flowing in the cooling unit 81a is cooled in accordance with the temperature difference from the outside air and snow. Subsequently, the fluid cooled by the cooling unit 81a flows into the valve structure V through the right connection flow path 81aR. The fluid flowing into the valve structure V is delivered to the first flow path C1.

The fluid delivered to the first flow path C1 flows into the first heat exchange unit 81b. The fluid flowing into the first heat exchange unit 81b is heat-exchanged with the battery BT. This decreases the temperature of the battery BT while the temperature of the fluid increases. That is, the fluid functions as a coolant, thereby cooling the battery BT.

The fluid heated in the first heat exchange unit 81b flows into the cooling unit 81a through the first flow path C1, the third flow path C3, and the left connection flow path 81aL. As described above, the fluid heated in the first heat exchange unit 81b returns to the cooling unit 81a to be cooled again.

As described above, in the example shown in FIG. 11, the cooling of the fluid by the cooling unit 81a and the cooling of the battery BT by the fluid are repeatedly performed. This controls the rise in the temperature of the battery BT. In this example, the heat exchange between the fluid and the electric motor M is not performed, which enables cooling the battery BT more efficiently.

[Heat Exchange in the Present Embodiment: Heating of Battery BT and Electric Motor M]

Figure 12:
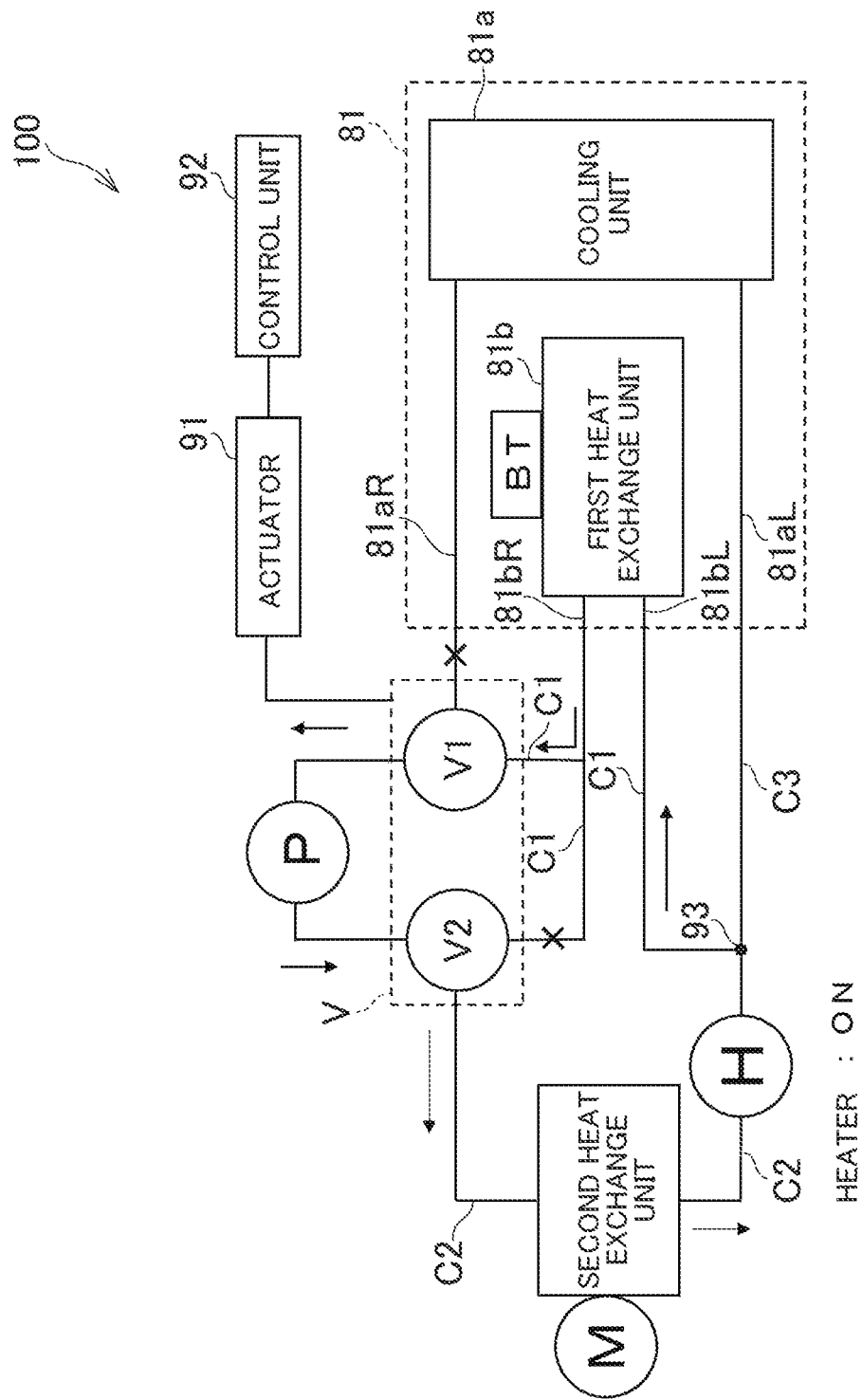
FIG. 12 is a schematic diagram of a flow path and its peripheral members in the electric snowmobile according to the present embodiment.

Referring to FIG. 12, the heating of the battery BT and the electric motor M using the heat exchanger 81 will be described.

In the example shown in FIG. 12, the pump P and the valve structure V operate so as to deliver the fluid, which flows into the valve structure V from the first heat exchange unit 81b through the first flow path C1, to the second flow path C2.

Further, in the example shown in FIG. 12, the heater H for heating the fluid flowing through the second flow path C2 is turned ON (energized).

The heater H heats the fluid flowing through the second flow path C2. The fluid heated by the heater H flows into the first heat exchange unit 81b. The fluid flowing into the first heat exchange unit 81b is heat-exchanged with the battery BT. This increases the temperature of the battery BT while the temperature of the fluid decreases. That is, the fluid functions as a heating medium, thereby heating the battery BT.

The heated fluid is delivered to the first flow path C, and flows into the valve structure V. The fluid flowing into the valve structure V is delivered to the second flow path C2, and flows into the second heat exchange unit 55.

The fluid flowing into the second heat exchange unit 55 is heat-exchanged with the electric motor M. This increases the temperature of the electric motor M while the temperature of the fluid decreases. That is, the fluid functions as a heating medium, thereby heating the battery BT.

The fluid cooled in the second heat exchange unit 55 is delivered to the second flow path C2 to be heated again by the heater H.

As described above, the heating of the fluid by the heater H and the heating of the battery BT and the electric motor M by the fluid are repeatedly performed. This prevents the temperatures of the battery BT and the electric motor M from being lowered. The arrangement of the heater H is not limited to the example shown in FIG. 9. The heater H may be disposed in a position at least capable of heating the fluid flowing through the first flow path C1 or the second flow path C2.

[Modification of the Embodiment]

Figure 13:
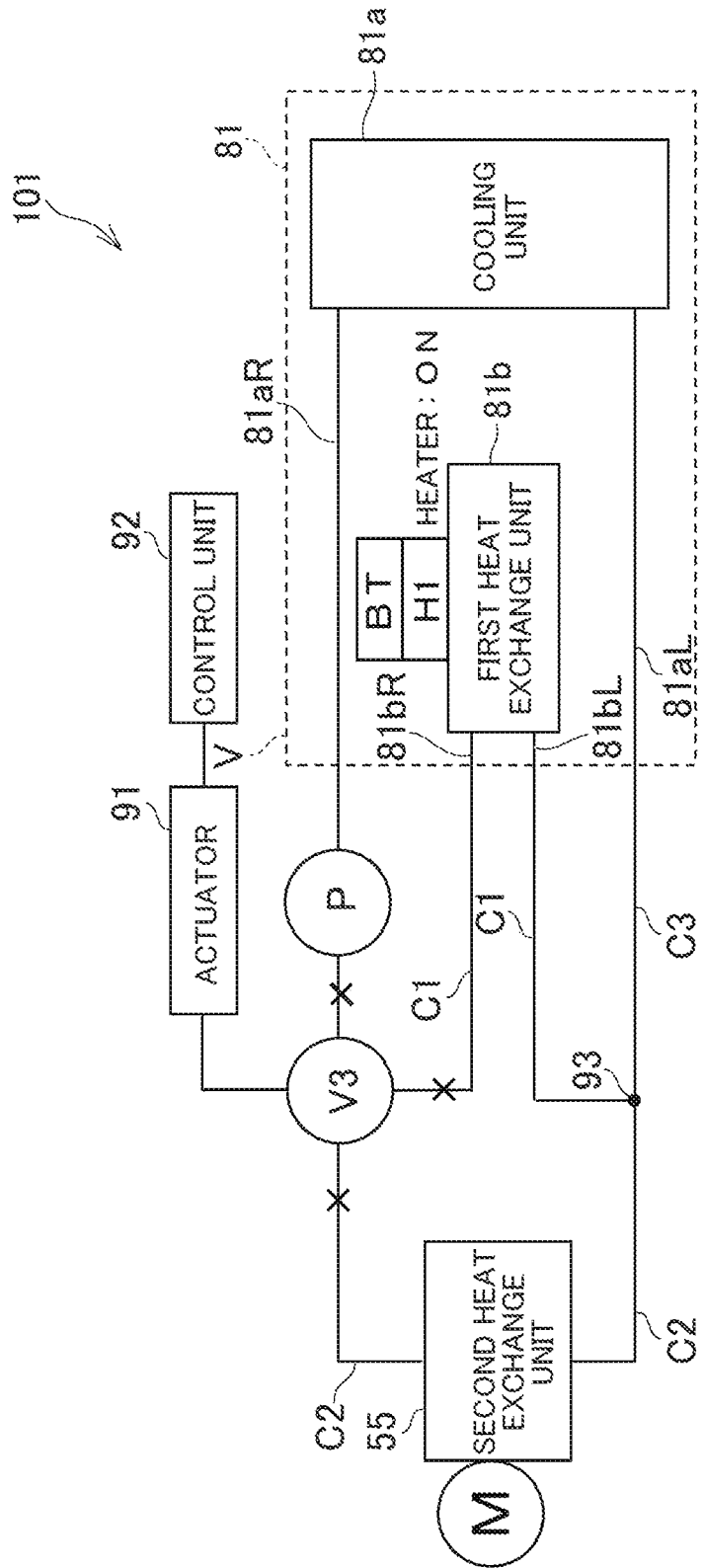
FIG. 13 is a schematic diagram of a flow path and its peripheral members in the electric snowmobile according to a first modification.

Referring to FIG. 13, a modification of the present embodiment will be described. FIGS. 9 to 12 show the example in which the valve structure includes two valves, while an electric snowmobile 101 of the modification has one valve V3. The valve V3 is a three-way valve connected to the pump P, the first flow path C1, and the second flow path C2.

Further, the electric snowmobile 101 of the modification includes a heating sheet H1 provided on the side surface of the battery BT instead of the heater H shown in FIGS. 9 to 12. The heating sheet H1 is a sheet-like heater that is provided in contact with or close to the battery BT so as to be along the side of the battery BT and heats the battery BT.

The heating sheet H1 may be provided, for example, to be along the upper surface of the battery BT. Such a configuration allows the heating sheet H1 to also serve as a sheet heater for heating the driver's seat S above the battery BT. That is, the heating sheet H1 enables heating the driver's seat S in addition to heating the fluid flowing through the first heat exchange unit 81b.

In the example shown in FIG. 13, the valve V3 operates to prevent the fluid from flowing into the valve V3 and flowing out from the valve V3. As such, the fluid is controlled not to flow regardless of the operation of the pump P. That is, the fluid cooled in the cooling unit 81*a* is contained in the cooling unit 81*a*, and does not flow into the first heat exchange unit 81*b* and the second heat exchange unit 55. This can prevent the temperature of the battery BT and the electric motor M from being lowered.

[Others]

The flow paths shown in FIGS. 9 to 13 are only examples and are not limited thereto. The electric snowmobile 100 may at least include a flow path for delivering the fluid cooled in the cooling unit 81*a* to the first heat exchange unit 81*b*, a flow path for delivering the fluid cooled in the cooling unit 81*a* to the second heat exchange unit 55, a flow path for delivering the fluid heat-exchanged in the first heat exchange unit 81*b* and the second heat exchange unit 55 to the cooling unit 81*a*.

The number and arrangement of the valve structure V and the pump P shown in FIGS. 9 to 13 are only examples, and are not limited thereto.

Further, in the present embodiment and the modification thereof, one battery BT is disposed on the heat exchanger 81 of the body frame 80, but the present invention is not limited thereto. That is, a plurality of batteries BT may be disposed on the heat exchanger 81. A battery suspended by the right front frame 13R and the left front frame 13L, for example, and disposed above the electric motor M may be additionally provided. The battery BT may include a plurality of battery cells.

Figure 14:
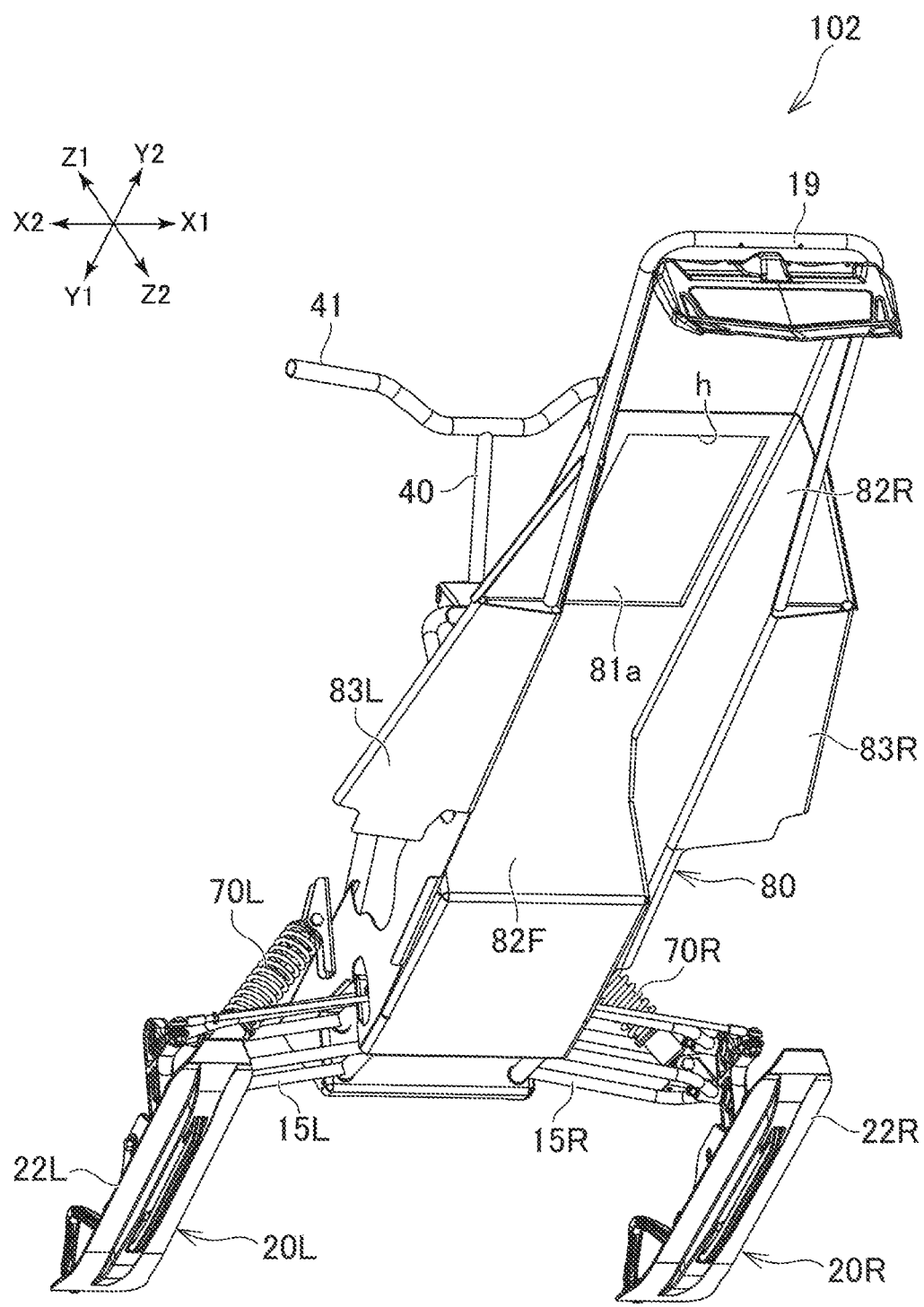
FIG. 14 is a perspective view of the electric snowmobile according to a second modification seen obliquely from below on a rear side of the electric snowmobile.

Further, in the present embodiment and the modification thereof, the upper plate of the body frame 80 has been described as the heat exchanger 81. Such a configuration reduces the number of parts in the body frame 80 and weight of the body frame 80. However, the present invention is not limited thereto, and the body frame 80 may have a plate-like upper plate, and the heat exchanger 81 may be provided on the upper surface or the lower surface of the upper plate as a separate member, for example. In this case, an opening h may be formed in the upper plate of the body frame 80, and the heat exchanger 81 may be provided such that a portion of the heat exchanger 81 is exposed from the opening h to face the track belt 31. Specifically, the heat exchanger 81 may be provided on the upper plate of the body frame 80 such that the cooling unit 81*a* or the first heat exchange unit 81*b* is exposed from the opening h. As an example, FIG. 14 shows an electric snowmobile 102 in which the opening h is formed in the upper plate of the body frame 80, and the cooling unit 81*a*, which is a portion of the heat exchanger 81, is exposed from the opening h. According to this configuration, moisture and snow wound from the track belt 31 come into contact with the back surface of the cooling unit 81*a* through the opening h. This results in improving the cooling performance of the cooling unit 81*a* of the heat exchanger 81, which is a separate member from the upper plate of the body frame 80.

The cooling unit 81*a* and the first heat exchange unit 81*b* are not limited to be formed of one member, and may be separate members. In this case, the cooling unit 81*a* and the first heat exchange unit 81*b* may be connected to each other by a flow path, such as a pipe.

In the present embodiment and the modification thereof, the upper surface of the upper sheet metal 811 is a flat surface, on which the battery BT is disposed. Such a configuration enables the posture of the battery BT disposed on the upper sheet metal 811 to be stabilized. Further, the contact area of the lower surface of the battery BT to the upper sheet metal 811 (first heat exchange unit 81*b*) can be maximized, which serves to efficiently perform heat exchange in the first heat exchange unit 81*b*. However, the present invention is not limited to this example, and the upper sheet metal 811 may be pressed to be uneven.

Further, in the present embodiment and the modification thereof, the example has been described in which the battery BT and the electric motor M exchange heat with the fluid, but the object for performing the heat exchange is not limited thereto. For example, in addition to the battery BT and the electric motor M, the heat exchange may be performed between the fluid and an inverter that is driven by the power supplied from the battery BT and controls the rotation of the electric motor M.

[Outline of Embodiment]

(1) An electric snowmobile 100 includes a body frame 80 extending in a front-rear direction, a driver's seat S supported by the body frame 80, an electric motor M supported by the body frame 80, a right ski 20R and a left ski 20L supported by the body frame 80, a track mechanism 30 including a track belt 31 and supported by the body frame 80 below the driver's seat S, a battery BT that supplies electric power to the electric motor M, a cooling unit 81*a* that cools fluid at least in accordance with outside air, a first heat exchange unit 81*b* that performs heat exchange between the battery BT and the fluid, a second heat exchange unit 55 that performs heat exchange between the electric motor M and the fluid, a first flow path C1 for delivering the fluid cooled in the cooling unit 81*a* to the first heat exchange unit 81*b*, a second flow path C2 for delivering the fluid cooled in the cooling unit 81*a* to the second heat exchange unit 55, and a third flow path C3 for delivering the fluid heat-exchanged in the first heat exchange unit 81*b* and the fluid heat-exchanged in the second heat exchange unit 55 to the cooling unit 81*a*.

(2) The electric snowmobile 100 includes a valve structure V capable of adjusting a flow rate of the fluid to be delivered to the first flow path C1 and a flow rate of the fluid to be delivered to the second flow path C2.

(3) The valve structure V delivers fluid to at least one or both of the first flow path C1 and the second flow path C2.

(4) The electric snowmobile 100 includes a control unit 92 that controls the valve structure V based on at least one of a temperature of the battery BT or a temperature of the electric motor M.

(5) The first flow path C1 and the second flow path C2 join at the joining unit 93 and are connected to the third flow path C3.

(6) The electric snowmobile 100 includes a pump P for delivering the fluid to the third flow path C3 through the first flow path C1 and/or the second flow path C2.

(7) A heating unit that heats the fluid flowing through at least the first flow path C1 or the second flow path C2 is provided.

(8) The heating unit is a heating sheet H1 that heats the battery BT.

(9) The heating sheet H1 is disposed below the driver's seat S and on an upper surface of the battery BT.

(10) At least one of the cooling unit 81*a* or the first heat exchange unit 81*b* forms a portion of the body frame 80.

(11) An upper plate of the body frame 80 is a plate-like heat exchanger 81 including the cooling unit 81*a* and the first heat exchange unit 81*b*.

(12) An opening is formed in an upper plate of the body frame 80 such that at least one of the cooling unit 81*a* or the first heat exchange unit 81*b* is exposed from the opening so as to face the track belt 31.

(13) The cooling unit 81*a* has a larger capacity than the first heat exchange unit 81*b*.

(14) The battery BT is disposed below the driver's seat S and on the first heat exchange unit 81*b*.

The present invention is not limited to embodiment described above, and various modifications can be made. For example, the configurations described in embodiment can be replaced by a configuration that is substantially the same, a configuration that provides the same action and effect, or a configuration that is capable of achieving the same object.

What is claimed is:

1. An electric snowmobile comprising:
a body frame extending in a front-rear direction;
a driver's seat supported by the body frame;
an electric motor supported by the body frame;
a ski supported by the body frame;
a track mechanism, which includes a track belt, and which is supported by the body frame below the driver's seat;
a battery that supplies electric power to the electric motor;
a cooling unit that cools fluid at least with outside air;
a first heat exchange unit that performs heat exchange between the battery and the fluid;
a second heat exchange unit that performs heat exchange between the electric motor and the fluid;
a first flow path for delivering the fluid cooled in the cooling unit to the first heat exchange unit;
a second flow path for delivering the fluid cooled in the cooling unit to the second heat exchange unit; and
a third flow path for delivering the fluid heat-exchanged in the first heat exchange unit and the fluid heat-exchanged in the second heat exchange unit to the cooling unit.

2. The electric snowmobile according to claim 1, comprising a flow rate adjusting unit capable of adjusting a flow rate of the fluid sent to the first flow path and a flow rate of the fluid sent to the second flow path.

3. The electric snowmobile according to claim 1, wherein the flow rate adjusting unit delivers the fluid to at least one or both of the first flow path and the second flow path.

4. The electric snowmobile according to claim 1, comprising a control unit that controls the flow rate adjusting unit based on at least one of a temperature of the battery or a temperature of the electric motor.

5. The electric snowmobile according to claim 1, wherein the first flow path and the second flow path join at a joining portion and are connected to the third flow path.

6. The electric snowmobile according to claim 1, further comprising a pump for delivering the fluid to the third flow path through the first flow path and/or the second flow path.

7. The electric snowmobile according to claim 1, further comprising a heating unit that heats the fluid flowing through at least the first flow path or the second flow path.

8. The electric snowmobile according to claim 7, wherein the heating unit is a heating sheet that heats the battery.

9. The electric snowmobile according to claim 8, wherein the heating sheet is disposed below the driver's seat and on an upper surface of the battery.

10. The electric snowmobile according to claim 1, wherein
at least one of the cooling unit or the first heat exchange unit forms a portion of the body frame.

11. The electric snowmobile according to claim 1, wherein
an upper plate of the body frame is a plate-like heat exchanger including the cooling unit and the first heat exchange unit.

12. The electric snowmobile according to claim 1, wherein
an opening is formed in an upper plate of the body frame such that at least one of the cooling unit or the first heat exchange unit is exposed from the opening so as to face the track belt.

13. The electric snowmobile according to claim 1, wherein
the cooling unit has a larger capacity than the first heat exchange unit.

14. The electric snowmobile according to claim 1, wherein
the battery is disposed below the driver's seat and on the first heat exchange unit.

\* \* \* \* \*